(12) United States Patent
Nielsen

(10) Patent No.: US 7,839,211 B2
(45) Date of Patent: Nov. 23, 2010

(54) ERROR CORRECTION SYSTEM FOR A CLASS-D POWER STAGE

(75) Inventor: Ole Neis Nielsen, Copenhagen N (DK)

(73) Assignee: Bang & Olufsen Icepower A/S, Kgs. Lyngby (DK)

( * ) Notice: Subject to any disclaimer, the term of this patent is extended or adjusted under 35 U.S.C. 154(b) by 0 days.

(21) Appl. No.: 12/519,855

(22) PCT Filed: Dec. 21, 2007

(86) PCT No.: PCT/IB2007/055279

§ 371 (c)(1),
(2), (4) Date: Nov. 10, 2009

(87) PCT Pub. No.: WO2008/075318

PCT Pub. Date: Jun. 26, 2008

(65) Prior Publication Data

US 2010/0097139 A1 Apr. 22, 2010

(30) Foreign Application Priority Data

Dec. 21, 2006 (DK) ............................. 2006 01689

(51) Int. Cl.
*H03F 3/38* (2006.01)
(52) U.S. Cl. .......................... 330/10; 330/251
(58) Field of Classification Search .......... 330/10, 330/251, 207 A
See application file for complete search history.

(56) References Cited

U.S. PATENT DOCUMENTS

| | | | |
|---|---|---|---|
| 4,015,213 A * | 3/1977 | Hamada | 330/10 |
| 6,362,683 B1 * | 3/2002 | Miao et al. | 330/10 |
| 6,373,334 B1 | 4/2002 | Melsanson | |
| 6,404,280 B1 | 6/2002 | Jeng | |
| 6,414,614 B1 | 7/2002 | Melanson | |
| 6,504,427 B2 | 1/2003 | Midya et al. | |
| 6,768,779 B1 | 7/2004 | Nielsen | |

(Continued)

FOREIGN PATENT DOCUMENTS

DE 19741 794 3/1999

(Continued)

*Primary Examiner*—Henry K Choe
(74) *Attorney, Agent, or Firm*—Stites & Harbison PLLC; Marvin Petry

(57) ABSTRACT

The present invention relates to a method for correcting for a source of non-linearity and noise introduced in a switching power amplification stage during power amplification of a pulse-modulated reference signal from a pulse modulator, where the method comprises the following steps: —providing an output stage embedded in an analogue self-oscillating control loop able to receive a pulse-referenced input signal; —generating a feedback signal from the switching power amplification stage or after a demodulation filter; —deriving an error signal by comparing the feedback signal with the reference signal; —filtering the error signal by a low pass filter for reducing the higher harmonics of the carrier; —adding a compensator for generating high loop gain in the audio band; —feeding the compensator output to a zero cross detector or comparator, thus providing a carrier for re-modulation or re-timing by feeding the filtered signal to a zero cross detector or comparator, which controls the output stage. The invention furthermore relates to various systems for implementing the above method.

34 Claims, 4 Drawing Sheets

U.S. PATENT DOCUMENTS

| | | | |
|---|---|---|---|
| 7,317,349 B2 * | 1/2008 | Morishima | 330/10 |
| 2005/0012546 A1 | 1/2005 | Jeong et al. | |
| 2006/0034365 A1 | 2/2006 | Song et al. | |
| 2006/0158245 A1 | 7/2006 | Ishikawa | |
| 2006/0208794 A1 | 9/2006 | Morishima | |
| 2008/0315945 A1 | 12/2008 | Nuijten | |

FOREIGN PATENT DOCUMENTS

| WO | WO 2006/051478 | 5/2006 |
|---|---|---|
| WO | WO 2007/098766 | 9/2007 |

* cited by examiner

ERROR CORRECTION SYSTEM FOR A CLASS-D POWER STAGE

TECHNICAL FIELD

The present invention relates in general to error correction systems and to power conversion system implementing such an error correction system. More specifically, the invention relates to a pulse-referenced control system for reducing errors introduced by the class D output stage. Application is direct digital audio power conversion and general DC-DC or DC-AC power conversion systems controlled from the digital domain.

BACKGROUND OF THE INVENTION

The advantages of power amplification based on a switching power stage are well known. The high efficiency provides several advantages, in terms of minimal weight and volume, higher power handling capability and improved reliability. The fundamental elements in switching power amplification are the modulator, the switching power stage and the demodulation filter to reconstitute the modulated signal. The non-linearity of the switching power stage presents a significant impediment to maintain the modulator performance throughout the subsequent power conversion by a switching power stage. This problem is fundamental and independent on the use of analogue modulation as analogue PWM, or digital modulation as direct digital PCM-PWM conversion.

PRIOR ART

In prior art, compensation for the non-ideal behaviour of the output stage in a pulse-referenced system has generally comprised:

1) N/D conversion of error signal and digital error correction, see for instance U.S. Pat. No. 6,373,334, US-2006-034365, US-2006-208794, U.S. Pat. No. 6,504,427. For this class of systems, the N/D conversion of the error signal is complicated and delay or phase shift will inherently limit the correcting loop gain. A system of this kind is illustrated in FIG. 1.

2) Edge or ramp correction unit, see for instance US-2005-012546, WO-9844626. A system of this kind is illustrated in FIG. 2. For this class of systems the fundamental problem is that the generation of the ramp introduces noise and complexity. Further, in the case of varying carrier frequency, the error correction gain becomes inversely proportional with the modulation index thus reducing THD (total harmonic distortion) compensation at high modulation index. Another issue is phase noise generation. Since the correcting unit is not adjusting the width of the pulses symmetrically around the natural sampling points of the PWM signal, the result is addition of phase noise when the pulse width is adjusted.

An attempt to overcome the error correction limitations or phase noise is proposed in WO-2006/051478, WO-200/6079960, U.S. Pat. No. 6,404,280 but on the cost of increased complexity.

Because of the linear regulation approach, ramp correction systems require many (for instance two to five) long time constants for filtering the error signal. This filtering occupies large silicon area if a suitable impedance level should be kept.

It is very critical to maintain a low impedance level in order to minimise thermal noise and since the capacitor size in general is inversely proportional to the impedance level, filters with pole/zeroes near the audio band together with a low impedance level require large silicon area.

3) amplitude control is for instance described in US2006158245 and illustrated in FIG. 3. A different approach of realising a correcting unit is to control the power supply voltage, which clearly limits the invention to system where the power supply is an integrated part of the amplifier.

Different prior art systems and methods solve some of the above issues but not at the same time and a need remains to reach a higher performance level.

OBJECTS OF THE INVENTION

It is an object of the present invention to provide a method and corresponding system by means of which there can be achieved a highly efficient silicon implementation, the ability to accept PDM signals of varying frequency, high PSRR, no phase noise and unlimited regulation region. These and other objects and advantages are attained according to the method and corresponding system according to the present invention.

SUMMARY OF THE INVENTION

As known within the art analogue self-oscillating class-D amplifiers have very high loop gain to suppress errors from the output stage and perturbations on the power supplies. By embedding the output stage inside an intentionally unstable loop, some very beneficial properties are attained. Firstly, the loop gain bandwidth is 5-10 times greater than for a normal loop, where normal stability criteria are obeyed. Secondly, all time constants are also 5-10 times lower, which means a corresponding reduction of capacitor size. This is a very important aspect when implementing such systems on silicon chips etc.

The invention uses such analogue systems, which by rearrangement are able to accept a pulse-coded signal instead of an un-modulated base band signal as input.

Since a pulse-referenced signal is now used, the oscillating control loop will lock on an incoming carrier and the unstable behaviour of the loop itself becomes masked by the carrier. The input carrier will be transferred through the system with only a small delay.

A non-trivial task is to enable such analogue systems to accept a pulse-referenced signal without unreasonable bandwidth and slew rate requirements being made on e.g. operational amplifiers.

According to the invention, one proposed way to solve this is by using an inverting realisation, which means that it is possible to generate a filtered error signal entirely by passive components. The error signal in this case is deducted by summing the output signal with the reference signal and then low pass filtering, all by passive means. It is particularly important here to enable the use of passive components since active components cannot handle the high frequency content of the output and reference signals.

The present invention can be implemented both with feedback before and after the demodulation filter.

It is expedient that the pulse-reference control system comprises the following fundamental elements:

(1) An input terminal receiving a pulse-modulated signal.
(2) A feedback (such as a state feedback) with compensation.
(3) A difference block to generate an error signal and a compensator/filter to shape this error signal.

According to a first aspect of the present invention there is provided a method of correcting for a source of non-linearity and noise introduced in a switching power amplification stage during power amplification of a pulse-modulated reference signal from a pulse modulator, comprising:

providing an output stage embedded in an analogue self-oscillating control loop able to receive a pulse-referenced input signal;

generating a feedback signal from the switching power amplification stage or after a subsequent demodulation filter;

deriving an error signal by comparing the feedback signal with the reference signal;

filtering the error signal by a low pass filter for reducing the higher harmonics of the carrier;

adding a compensator for generating high loop gain in the audio band;

feeding the compensator output to a zero cross detector or comparator, thus providing a carrier for re-modulation or re-timing by feeding the filtered signal to a zero cross detector or comparator, which controls the output stage.

in the method according to the invention, the loop is designed to be controlled self-oscillating at a frequency similarly or higher than the carrier of the pulse-referenced signal and the loop is defined as a signal path surrounding the output stage with or without demodulation stage. The self-oscillating nature is defined as having poles located in the right half of the s-plane. The self-oscillation can alternatively be controlled by the use of hysteresis. This definition covers all filter structures: cascades and higher order compensation blocks and also all loop characteristics having poles in the right half plane of s-plane or hysteresis.

According to a second aspect of the present invention there is provided a system of correcting for a source of non-linearity and noise introduced in a switching power amplification stage during power amplification of a pulse-modulated reference signal from a pulse modulator, comprising:

an output stage embedded in an analogue self-oscillating control loop able to receive a pulse-referenced input signal;

means for generating a feedback signal from the output of a switching power amplification stage from the output of a subsequent demodulation filter;

means for deriving an error signal by comparing the feedback signal with the reference signal;

means for filtering the error signal by a low pass filter for reducing the higher harmonics of the carrier;

a compensator for generating high loop gain in the audio band;

a zero cross detector or comparator means for feeding the compensator output to a zero cross detector or comparator, thus providing a carrier for re-modulation or re-timing by feeding the filtered signal to a zero cross detector or comparator, which controls the output stage.

The inventive concept comprises various embodiments relating to actual implementation of the control function within the correction unit. The invention comprises various advantageous embodiments concerning improved digital-analogue power conversion suitable for audio power amplification.

According to the invention there is provided a fundamentally new control method for improved amplification of a pulse-modulated input signal. The application range is extremely broad in that the invention can be used with any pulse-modulated input, modulated in the analogue or digital domain, and to feed any load, where a pulsed power signal of controllable quality is needed. Ultimately, the principle of the invention may provide perfect reproduction of the pulsed reference signal, such that the output is a product of the input and a constant independent on any disturbances that are introduced during power conversion.

An important aspect of the present invention is a high self-oscillation frequency and consequently a large control bandwidth. The self-oscillation frequency can according to the invention be at least up to ten times the input carrier frequency and a high degree of error suppression can be attained by means of a simple circuit implementation according to the invention as exemplified by the various embodiment of the invention described in the following detailed description.

BRIEF DESCRIPTION OF THE DRAWINGS

The invention will be better understood with reference to the following detailed description of preferred embodiments of the invention in conjunction with the figures, where.

DETAILED DESCRIPTION OF THE PREFERRED EMBODIMENTS

Figure 1:
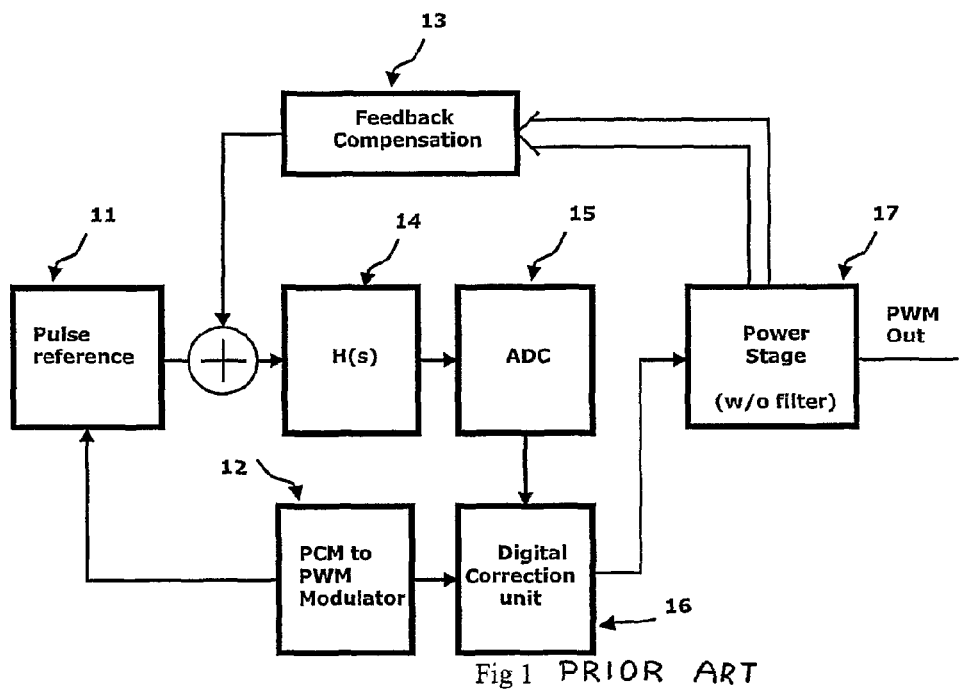
FIG. 1 shows a block diagram illustrating the principle of a prior art power amplifier with control loop.

With reference to FIG. 1 there is shown a block diagram illustrating the principle of a prior art power amplifier with control loop.

Figure 2:
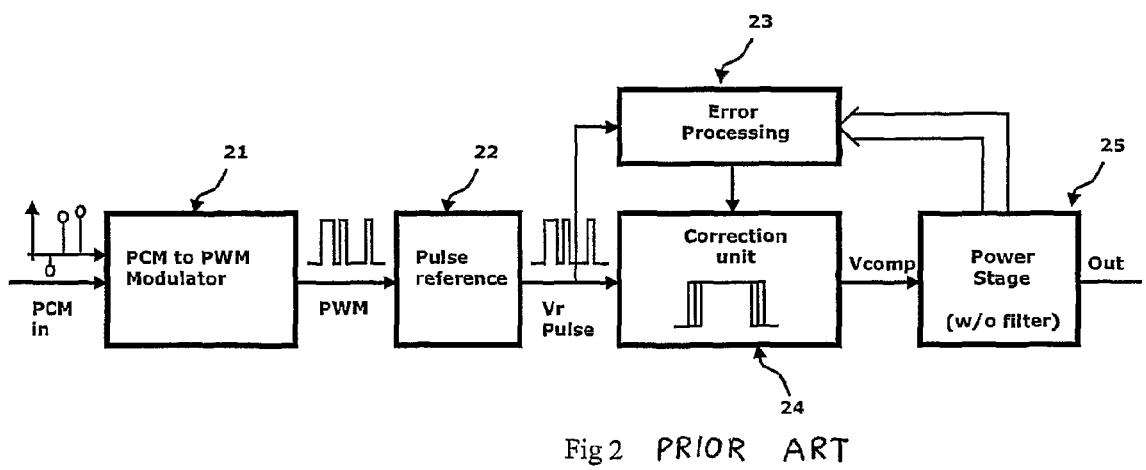
FIG. 2 shows schematically a prior art method of power conversion based on digital pulse modulation.
Figure 3:
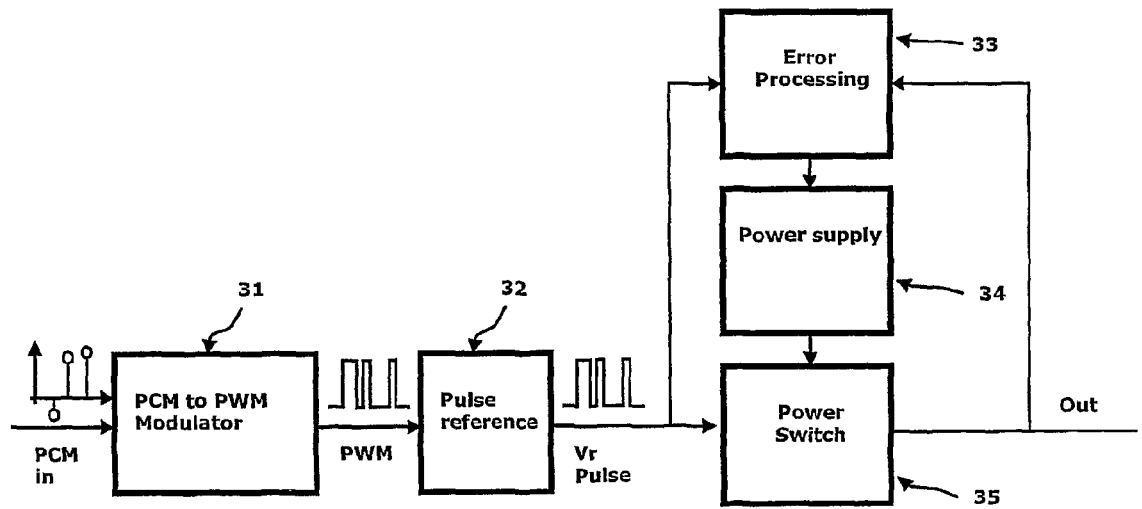
FIG. 3 shows another prior art circuit.

Referring to FIG. 2 there is schematically shown a prior art method of power conversion based on digital pulse modulation;

Referring to FIG. 3 there is shown another example of a prior art circuit.

Figure 4:
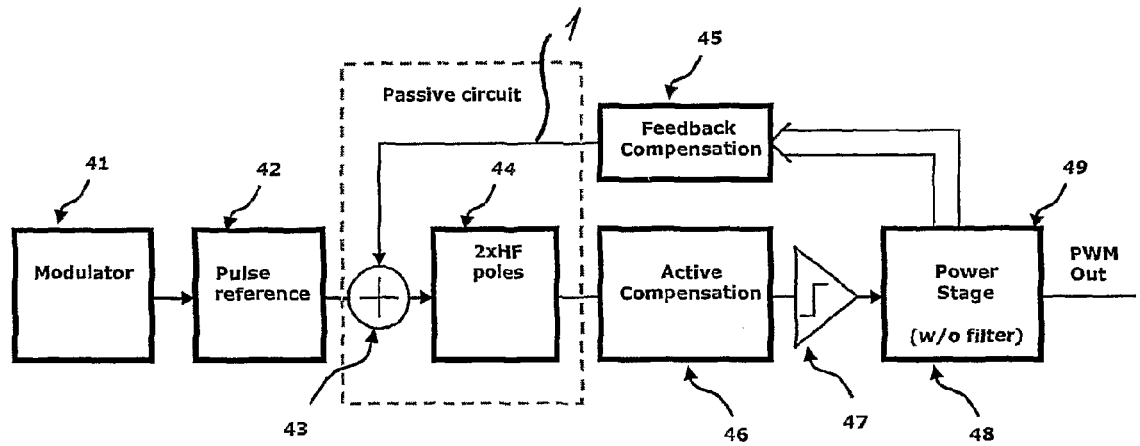
FIG. 4 shows a schematic representation of a general model of the present invention.

Referring to FIG. 4 there is shown an embodiment of a system according to the present invention, where a general system using feedback before or after the demodulation filter is shown. First, the PCM is converted to a pulse-coded signal 41. The pulse-coded signal can be of many classes, but for convenience it will be termed PWM here. The next step consists of generating a reference signal 42, where a PWM signal is generated with stabile amplitude. This is often termed as a 1 bit D/A converter. A beneficial method is to invert the output signal since the generation of the error signal is now a summing function 43 instead of a difference function. This is very important for the practical implementation since summing 43 and filtering 44 can be done by passive means (resistors and capacitors). These components are practically ideal from an audio point of view. Thus, according to preferred embodiments of the invention the feedback signal is inverted and preferably this can be attained by inversion of the output signal carried out in the output stage. This operation is a purely logical operation that does not give rise to THD (total harmonic distortion) or noise. The error signal is now filtered to an extent where normal operational amplifiers can be used, e.g. with a slew rate=3 V/us and Fbw=10 MHz. The filtered error signal is now fed into the compensator 46, which may be formed by a simple integrator with a very large bandwidth, typically several times the carrier frequency. Then follows the quantiser or comparator 47, which controls the output stage 48. The feedback compensation 45 actually carried out depends on whether the feedback point is before or after the demodulation filter. In case of being before the demodulation filter, the feedback compensation will typically not be frequency dependent and only determine the gain. In the case of feedback after the filter, the filters' phase lag must be compensated to maintain a high self-oscillating frequency. This could for instance be accomplished by lead compensation.

Figure 5:
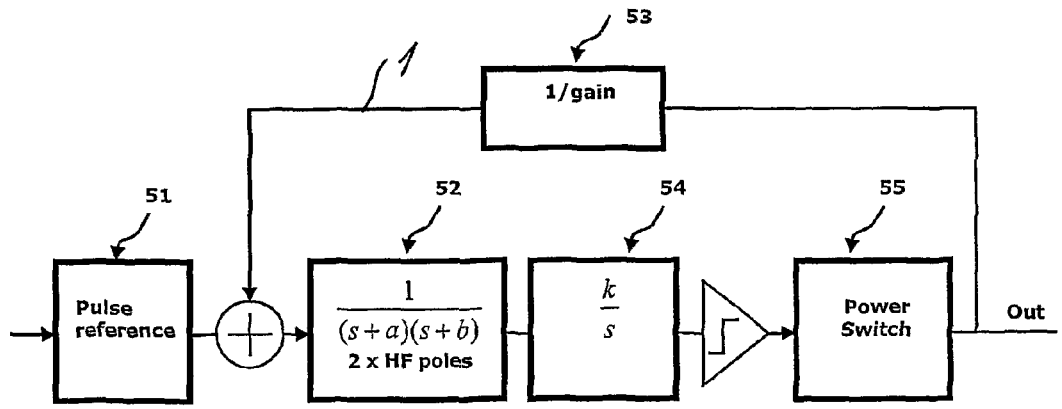
FIG. 5 shows a block diagram of an embodiment of the invention comprising a system with feedback before the demodulation filter.
Figure 6:
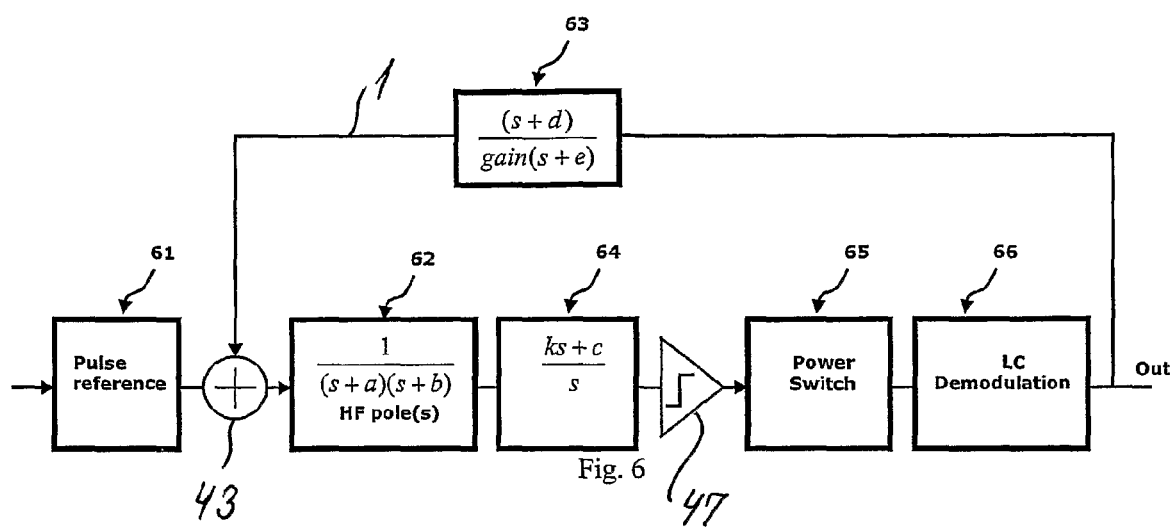
FIG. 6 shows a block diagram of an embodiment of the invention comprising a system with feedback after the demodulation filter.

FIG. 5 shows a system according to a specific embodiment of the invention using feedback before the demodulation filter 66 (see FIG. 6). The system comprises the low pass filter 52 for filtering the error signal provided by the summing means 43. The output signal from the low pass filter is compensated by means of an integrator 54 before being provided to the comparator 47 controlling the output stage (power switch) 55. As mentioned above in connection with FIG. 4, the feedback path is in this embodiment not dependent on frequency, the feedback path only comprising the functional block 53 1/gain.

FIG. 6 shows a system according to an alternative specific embodiment of the invention using feedback after the demodulation filter 66. In this embodiment, the feedback path comprises a frequency dependent functional block 63 designed for compensating for the phase lag of the demodulation filter 66 as mentioned above. Also an alternative compensation network 64 is used in this embodiment.

The self-oscillating frequency will be within a certain frequency range and basically it is beneficial to have a self-oscillating frequency as high as possible. However, there is a risk that the synchronisation is lost if the carrier is considerably lower than the self-oscillating frequency. This will show up as extra transitions compared to the reference pulse. Therefore, when designing such systems, the self-oscillating frequency should preferably be 0.5-4 times the carrier frequency.

The self-oscillation (as for instance described by poles located in the right half of the s-plane) can be controlled in several ways.

Figure 7:
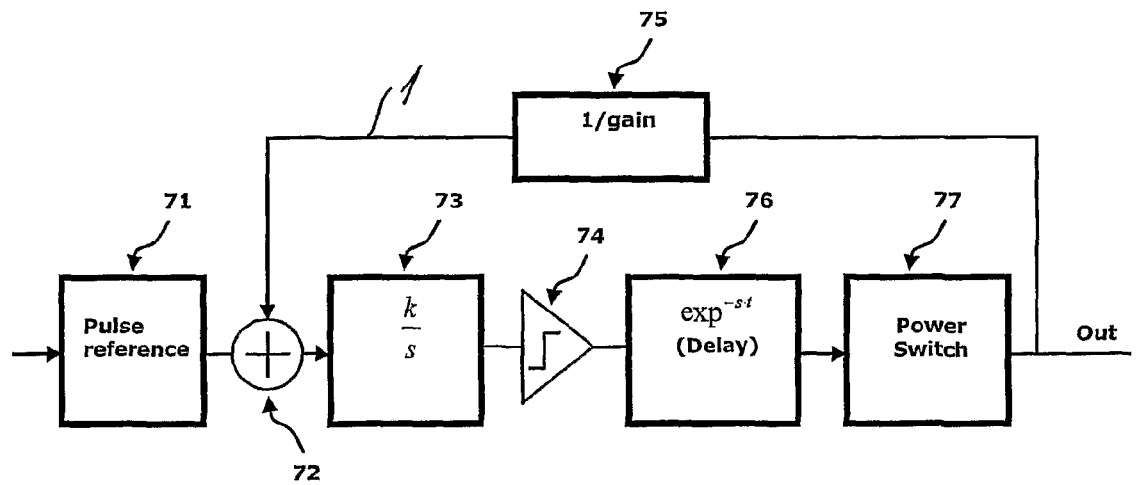
FIG. 7 shows an embodiment, where delay 76 has been inserted instead of the high frequency filtering of the error signal.

FIG. 7 shows an alternative embodiment where a delay 76 has been inserted instead of the high frequency filtering (i.e. the low pass filters 52 and 62) of the error signal. The delay 76 can be inserted anywhere in the loop, it will have the same effect.

Figure 8:
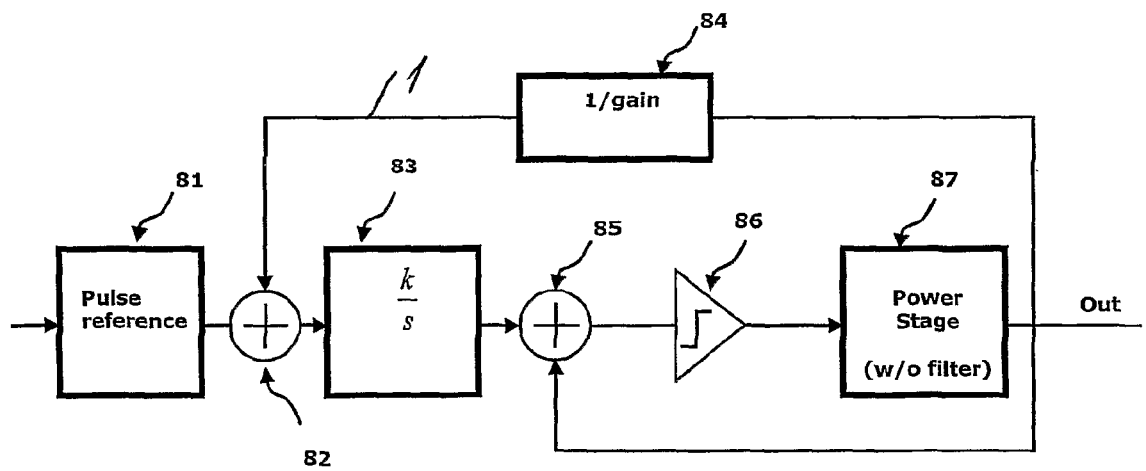
FIG. 8 shows another embodiment, where the self-oscillation is controlled by a hysteresis loop, whereby the amount of hysteresis will control the self-oscillation frequency.

FIG. 8 shows still another alternative embodiment, where the self-oscillation is controlled by a hysteresis loop 89. The amount of hysteresis will now control the self-oscillation frequency.

One preferred embodiment of the invention is particular in that pulse re-timing is based on using an analogue self-oscillating modulator as error-correcting unit. This analogue modulator must be designed in such a manner that it can accept a pulse-referenced input.

A preferred embodiment of the invention comprises a passive generation of the error signal by means of simple resistors and capacitors. This can greatly reduce the band width and slew rate requirement of the operational amplifiers used in the following compensator block. A slew rate of only 2-4 V/us is achieved with as small a capacitance as 30 pF total for one channel and still achieving a dynamic range of more than 100 dB.

According to a preferred embodiment of the invention, the upper cut-off frequency of the loop filter results in a self-oscillating system with higher error suppression than that of a normal control system, where normal stability criteria are obeyed. The self-oscillation nature of the system will, however, not result in a different carrier (carrier frequency), as the system according to the invention will be locked to the input pulse reference/carrier. The natural self-oscillating frequency of the invention should preferably be higher than the input carrier frequency, although this is not necessarily the case.

The fact that normal stability criteria do not need to be obeyed enables implementation of a high performance control system using short time constants compared to prior art. This is very beneficial for silicon implementation, since capacitor area can be minimised without having to compromise the signal impedance level securing low thermal noise contribution.

A preferred embodiment of the invention is using passive low pass pre-filtering of the error signal by means of simple RC network. This will ease the bandwidth requirements of the operational amplifier used to provide the main loop gain. This approach is possible, as normal stability criteria do not have to be obeyed.

The invention claimed is:

1. A method for correcting for a source of non-linearity and noise introduced in a switching power amplification stage during power amplification of a pulse-modulated reference signal from a pulse modulator, the method comprising:
   providing an output stage embedded in an analogue self-oscillating control loop able to receive a pulse-referenced input signal;
   generating a feedback signal from the switching power amplification stage or after a demodulation filter following the power amplification stage;
   deriving an error signal by comparing the feedback signal with the reference signal;
   filtering the error signal by a low pass filter for reducing the higher harmonics of the carrier;
   adding a compensator, for generating high loop gain in the audio band;
   feeding the compensator output to a zero cross detector or comparator, thus providing a carrier for re-modulation or re-timing by feeding the filtered signal to a zero cross detector or comparator, which controls the output stage.

2. A method for correcting for a source of non-linearity and noise introduced in a switching power amplification stage during power amplification of a pulse-modulated reference signal from a pulse modulator, the method comprising:
   providing an output stage embedded in an analogue self-oscillating control loop able to receive a pulse-referenced input signal;
   generating a feedback signal from the switching power amplification stage or after a demodulation filter following the power amplification stage;
   deriving an error signal by comparing the feedback signal with the reference signal;
   adding a compensator, for generating high loop gain in the audio band;
   feeding the compensator output to a zero cross detector or comparator, thus providing a carrier for re-modulation or re-timing by feeding the filtered signal to a zero cross detector or comparator, which controls the output stage;
   introducing a hysteresis loop, whereby self-oscillation is controlled by the use of hysteresis or a time delay, whereby self-oscillation is controlled by the time delay.

3. The method according to claim 2, where said control loop is designed to be self-oscillating at a frequency similarly to or higher than the carrier of the pulse-referenced signal and where the loop is defined as a signal path surrounding the output stage with or without demodulation stage and where the self-oscillating nature is defined as having poles in the right half of the s-plane.

4. An error correcting method according to claim 1, wherein said low pass filter is characterised by providing an extended loop bandwidth resulting in controlled self-oscillation.

5. The method according to claim 2, wherein the self-oscillating loop is locking to an incoming carrier frequency.

6. The method according to claim 1, wherein said low pass filter is passive.

7. The method according to claim 2, wherein the self-oscillating characteristic is defined by the loop having poles in the right half plane of the s-plane and where said poles can be placed by passive or active filter means, delay means or hysteresis means.

8. The method according to claim 2, wherein said compensation is carried out by integrating means having a transfer function of the form $H_C(s)=(ks+c)/s$, where k and c are constants.

9. The method according to claim 3, wherein said low pass filter has a transfer function of the form $H_F(s)=1/[(s+a)(s+b)]$.

10. The method according to claim 2, wherein the feedback signal provided to the summing means is inverted relative to the output signal from the power amplification stage or from the demodulation stage.

11. A system of correcting for a source of non-linearity and noise introduced in a switching power amplification stage during power amplification of a pulse-modulated reference signal from a pulse modulator, comprising:
an output stage embedded in an analogue self-oscillating control loop able to receive a pulse-referenced input signal;
means for generating a feedback signal from the output of a switching power amplification stage or from the output of a subsequent demodulation filter;
means for deriving an error signal by comparing the feedback signal with the reference signal;
means for filtering the error signal by a low pass filter for reducing the higher harmonics of the carrier;
a compensator for generating high loop gain in the audio band;
a zero cross detector or comparator;
means for feeding the output from said compensator to said zero cross detector or comparator, thus providing a carrier for re-modulation or re-timing by feeding the filtered signal to said zero cross detector or comparator, which controls the output stage.

12. The system according to claim 11, further comprising a demodulation filter connected to the output of the switching power amplification stage.

13. The system according to claim 12, wherein the feedback path is from the output of said demodulation filter.

14. A system of correcting for a source of non-linearity and noise introduced in a switching power amplification stage during power amplification of a pulse-modulated reference signal from a pulse modulator, comprising:
an output stage embedded in an analogue self-oscillating control loop able to receive a pulse-referenced input signal;
means for generating a feedback signal from the output of a switching power amplification stage or from the output of a subsequent demodulation filter;
means for deriving an error signal by comparing the feedback signal with the reference signal;
a compensator for generating high loop gain in the audio band;
a zero cross detector or comparator;
means for feeding the output from said compensator to said zero cross detector or comparator, thus providing a carrier for re-modulation or re-timing by feeding the filtered signal to said zero cross detector or comparator, which controls the output stage;
a delay means or a hysteresis means introduced in said feedback loop.

15. A system according to claim 14, wherein said compensation is carried out by integrating means (54, 73, 83) having a transfer function of the form $H_C(s)=(ks+c)/s$, where k and c are constants.

16. A system according to claim 15, wherein said low pass filter has a transfer function $H_F(s)=1/[(s+a)(s+b)]$.

17. A system according to 15, wherein said low pass filter is passive.

18. A system according to claim 14, wherein the feedback signal provided to the summing means is inverted relative to the output signal from the power amplification stage or from the demodulation stage.

19. The system according to claim 14, wherein pulses from the output of the switching power amplification stage drive a load.

20. The system according to claim 19, wherein said load includes a loudspeaker.

21. The system according to claim 14, wherein the system is incorporated into a power amplifier.

22. The method according to claim 1, where said control loop is designed to be self-oscillating at a frequency similarly to or higher than the carrier of the pulse-referenced signal and where the loop is defined as a signal path surrounding the output stage with or without demodulation stage and where the self-oscillating nature is defined as having poles in the right half of the s-plane.

23. The method according to claim 1, wherein the self-oscillating loop is locking to an incoming carrier frequency.

24. The method according to claim 1, wherein the self-oscillating characteristic is defined by the loop having poles in the right half plane of the s-plane and where said poles can be placed by passive or active filter means, delay means or hysteresis means.

25. The method according claim 1, wherein said compensation is carried out by integrating means having a transfer function of the form $H_C(s)=(ks+c)/s$, where k and c are constants.

26. The method according to claim 1, wherein said low pass filter has a transfer function of the form $H_F(s)=1/[(s+a)(s+b)]$.

27. The method according to claim 1, wherein the feedback signal provided to the summing means is inverted relative to the output signal from the power amplification stage or from the demodulation stage.

28. A system according to claim 11, wherein said compensation is carried out by integrating means having a transfer function of the form $H_C(s)=(ks+c)/s$, where k and c are constants.

29. A system according to claim 11, wherein said low pass filter has a transfer function $H_F(s)=1/[(s+a)(s+b)]$.

30. A system according to 11, wherein said low pass filter is passive.

31. A system according to claim 11, wherein the feedback signal provided to the summing means is inverted relative to the output signal from the power amplification stage or from the demodulation stage.

32. The system according to claim 11, wherein pulses from the output of the switching power amplification stage drive a load.

33. The system according to claim 32, wherein said load includes a loudspeaker.

34. The system according to claim 11, wherein the system is incorporated into a power amplifier.

* * * * *